United States Patent
Liang et al.

(10) Patent No.: US 10,754,674 B2
(45) Date of Patent: Aug. 25, 2020

(54) METHOD, APPARATUS, AND SYSTEM FOR REDUCING MEMORY USAGE OF A BROWSER IN A PORTABLE TERMINAL DEVICE

(71) Applicant: GUANGZHOU UCWEB COMPUTER TECHNOLOGY CO., LTD., Guangzhou (CN)

(72) Inventors: Jie Liang, Guangzhou (CN); Qing Huang, Guangzhou (CN)

(73) Assignee: Guangzhou UCWeb Computer Technology Co., Ltd., Guangzhou (CN)

( * ) Notice: Subject to any disclaimer, the term of this patent is extended or adjusted under 35 U.S.C. 154(b) by 42 days.

(21) Appl. No.: 14/966,954

(22) Filed: Dec. 11, 2015

(65) Prior Publication Data

US 2016/0170651 A1    Jun. 16, 2016

(30) Foreign Application Priority Data

Dec. 11, 2014  (CN) .......................... 2014 1 0768232

(51) Int. Cl.
| | |
|---|---|
| *G06F 9/455* | (2018.01) |
| *G06F 9/50* | (2006.01) |
| *G06F 12/02* | (2006.01) |
| *G06F 12/00* | (2006.01) |

(52) U.S. Cl.
CPC ............ *G06F 9/455* (2013.01); *G06F 9/5022* (2013.01); *G06F 9/5016* (2013.01); *G06F 12/00* (2013.01); *G06F 12/02* (2013.01)

(58) Field of Classification Search
CPC .......... G06F 12/02; G06F 12/00; G06F 9/455; G06F 9/5022; G06F 9/5016
See application file for complete search history.

(56) References Cited

U.S. PATENT DOCUMENTS

| | | | |
|---|---|---|---|
| 2003/0018870 A1 | 1/2003 | Abboud et al. | |
| 2010/0049775 A1* | 2/2010 | Rajawat | G06F 9/5016 707/813 |
| 2012/0317363 A1* | 12/2012 | Uola | G06F 17/30902 711/130 |
| 2012/0324198 A1* | 12/2012 | Spradlin | G06F 12/0223 711/170 |

(Continued)

FOREIGN PATENT DOCUMENTS

| | | |
|---|---|---|
| CN | 101908022 A | 12/2010 |
| CN | 102880551 A | 1/2013 |
| CN | 103984781 A | 8/2014 |

OTHER PUBLICATIONS

First Search for Chinese Application No. 201410768232.1 dated Feb. 12, 2018 (1 page).

(Continued)

*Primary Examiner* — Masud K Khan
(74) *Attorney, Agent, or Firm* — Sheppard Mullin Richter & Hampton LLP

(57) ABSTRACT

A method for reducing memory usage of a browser in a portable terminal device is disclosed. The method comprises mapping an anonymous memory, allocated by an operating system of the portable terminal device, into a process space of a browser; and removing the mapped anonymous memory from the process space of the browser, after an operation of the browser using the anonymous memory is completed.

16 Claims, 4 Drawing Sheets

(56) References Cited

U.S. PATENT DOCUMENTS

2013/0044260 A1* 2/2013 Vestergaard .............. G06F 3/14
                                                                                     348/515

OTHER PUBLICATIONS

First Office Action for Chinese Application No. 201410768232.1 dated Feb. 26, 2018 with English machine translation (12 pages).
Second Office Action for Chinese Application No. 201410768232.1 dated Oct. 8, 2018 with English machine translation (18 pages).

* cited by examiner

METHOD, APPARATUS, AND SYSTEM FOR REDUCING MEMORY USAGE OF A BROWSER IN A PORTABLE TERMINAL DEVICE

CROSS REFERENCE TO RELATED APPLICATION

The present application is based on and claims the benefits of priority to Chinese Application No. 201410768232.1, filed Dec. 11, 2014, the entire contents of which are incorporated herein by reference.

TECHNICAL FIELD

The present application relates to methods, apparatus, and systems for reducing memory usage of a browser in a portable terminal device.

BACKGROUND

With the development of wireless communications technologies, such as the third-generation mobile communications (3G) and the fourth-generation mobile communications (LTE) technologies, the wireless Internet has become an important networking method. With the 3G and/or LTE communication network infrastructure, portable smart terminal devices such as smart phones or tablet computers have been growing fast in development and become very popular. Accessing wireless Internet through portable intelligent terminal devices has gradually become one of the most important networking methods.

A browser is a key application on an intelligent terminal used for accessing the Internet. Limited by its size, the portable intelligent terminal device cannot be equipped with bulky large-capacity memories. Therefore, given the amount of total memory available, memory usage of the browser during browsing can significantly affect user experience. Excessive memory usage by the browser during browsing can cause the browser to run more slowly, have a long response lag, or have a freeze, thus affecting the user experience.

To improve the browsing experience, memory usage of the browser needs to be optimized, so that the browser does not occupy excessive system resources. Memory used for browsing large-capacity data such as pictures is an important cause for excessive memory usage by the browser. Therefore, how to save memory used for browsing web page pictures becomes an important topic for optimization. One solution includes a method of reducing size and color bit depth of the pictures. Because memory dedicated to a picture=picture length×picture width×color bit depth, theoretically, this solution can save system (memory) resources.

However, this solution has an issue: even though the size and the color bit depth of the picture are reduced, the picture will still be displayed in the original picture size and will suffer from a low resolution. For example, when a user wants to browse a screenshot of chat history, the chat content will not be displayed clearly after the size and the color bit depth of the original screenshot are reduced. Therefore, by this solution, the size and color bit depth of a picture in practice can only be reduced to a certain degree such that the quality effect is unaffected.

Another solution includes periodically clearing picture memory usage, administered by a timer. For example, after a timer is started in a browser, memory used for browsing pictures is monitored periodically and a threshold is set to avoid frequent re-decoding for releasing memories dedicated to pictures.

However, such solution cannot clear the excessively occupied memory in time, because the timer has a delay. Moreover, a delay of several seconds exists before the monitoring begins. Further, setting the memory threshold for the timer can cause the following problems: if the threshold is too small, despite the fact that memory can be released, it still causes frequent decoding, thus aggravating freezes of the browser; if the threshold is too large, excessive memory occupancy cannot be reduced effectively.

Therefore, a method and an apparatus that can timely and effectively release memory usage of a browser on a portable terminal device are desirable.

SUMMARY

One aspect of the present disclosure is directed to a method for reducing memory usage of a browser in a portable terminal device. The method includes mapping an anonymous memory, allocated by an operating system of the portable terminal device, into a process space of a browser. The method also includes removing the mapped anonymous memory from the process space of the browser, after an operation of the browser using the anonymous memory is completed.

Another aspect of the present disclosure is directed to an apparatus for reducing memory usage of a browser in a portable terminal device. The apparatus includes a mapping unit configured to map an anonymous memory, allocated by an operating system of the portable terminal device, into a process space of a browser; and a removal unit configured to remove the mapped anonymous memory from the process space of the browser, after an operation of the browser using the anonymous memory is completed.

Another aspect of the present disclosure is directed to a non-transitory computer-readable storage medium embodying a computer program product, the computer program product comprising instructions configured to cause a computing device to perform a method. The method comprises mapping an anonymous memory, allocated by an operating system of the portable terminal device, into a process space of a browser and removing the mapped anonymous memory from the process space of the browser, after an operation of the browser using the anonymous memory is completed.

Another aspect of the present disclosure is directed to a system for reducing memory usage of a browser in a portable terminal device. The system comprises a processor and a non-transitory computer-readable storage medium storing instructions. The instructions, when executed by the processor, cause the processor to map an anonymous memory, allocated by an operating system of the portable terminal device, into a process space of a browser and remove the mapped anonymous memory from the process space of the browser, after an operation of the browser using the anonymous memory is completed.

Additional features and advantages of the present disclosure will be set forth in part in the following detailed description, and in part will be obvious from the description, or may be learned by practice of the present disclosure. The features and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention as recited in the appended claims.

In some embodiments consistent with this disclosure, to implement optimization of browser memory occupancy, anonymous memory of an Android system (on a terminal device) is used to perform a specific operation such as picture decoding. For example, an anonymous memory of the system is mapped into a process space of a browser first. After the specific operation is completed by using the anonymous memory, the mapped anonymous memory is removed from the process space of the browser and is returned to the system. After the mapped anonymous memory is removed from the process space of the browser, the memory is not counted as memory occupied/used by the browser, and therefore, memory occupancy/usage of the browser is effectively reduced. The terminal device may include a processor and a computer-readable non-transitory storage medium (memory) storing instructions that, when executed by the processor, perform the methods/steps described below. The processor may include the units/modules/subunits described below, which execute the instructions and respectively perform the methods/steps. The storage medium may store the Android system or other types of system. The terminal device may be a cellphone or other types of portable electronic device. In this disclosure, system resources may refer to available memory/memory usage.

Figure 1:
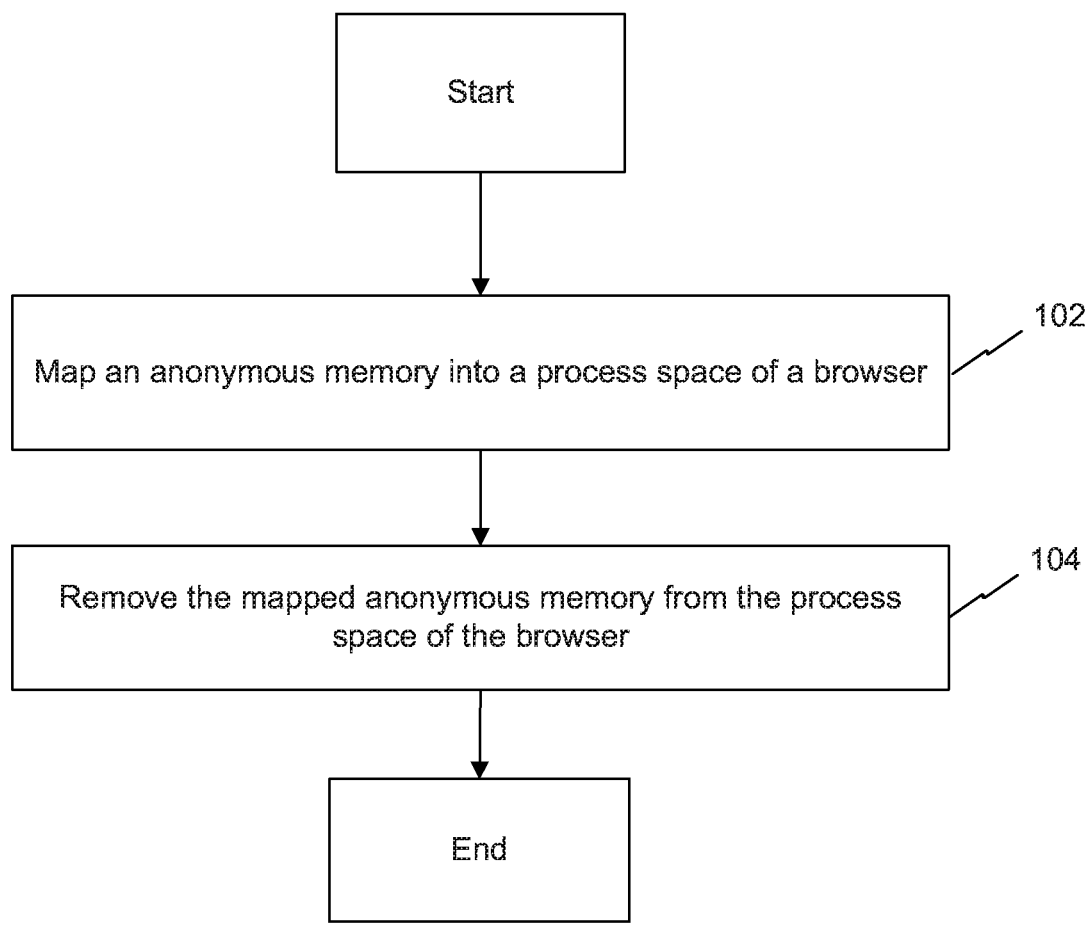
FIG. 1 is a flow diagram illustrating a method for reducing memory usage of a browser in a portable terminal device, according to an exemplary embodiment.

FIG. 1 shows a method 100 for reducing memory usage of a browser in a portable terminal device, according to an exemplary embodiment. At step 102, anonymous memory is mapped into a process space of a browser. The anonymous memory may be allocated by an operating system of the portable terminal device. Step 102 may be implemented when a user browses a web page and needs to perform an operation such as picture decoding. Step 102 may include steps described below with reference to FIG. 2.

The anonymous memory may refer to memories that do not have corresponding "stored files" (i.e. not backed up by any file) in a file system. The anonymous memory can be a part of the computer-readable non-transitory storage medium. For example, memory in a heap space and memory in a stack space are both anonymous memory. The Android system that is widely used in portable smart terminal devices provides such anonymous memory.

Although picture decoding is used as an example herein to describe reducing browser memory usage using anonymous memory, a person skilled in the art can understand that the anonymous memory mapped into the process space of the browser can be used for other operations, for example, used by a picture drawing module after the picture decoding.

At step 104, the mapped anonymous memory is removed from the process space of the browser, after an operation of the browser using the anonymous memory is completed. In one example, the anonymous memory is locked and is provided to a component (such as a decoder) that executes an operation. After the decoder completes the operation using the locked anonymous memory, the anonymous memory is unlocked and removed from the process space of the browser. The anonymous memory is removed from the process space of the browser and is delivered to the operating system for management. The removed anonymous memory is not counted as memory used by the browser, which is equivalent to completely releasing the memory.

The method for reducing memory occupancy disclosed can implement timely release of occupied memory without affecting a web page browsing experience of a user, thereby reducing freezes of the operating system or the browser and a chance of the browser being shut down due to excessive memory occupancy.

In addition, a system anonymous memory of a corresponding size can be applied for according to an operation to be executed and a release of the whole picture memory can be implemented, so that system resources are utilized more efficiently.

In some embodiments, after the anonymous memory is removed from the process space of the browser, the anonymous memory is managed by the operating system. The browser can use the anonymous memory again before the anonymous memory is taken back by the operating system. It can map the anonymous memory into the process space of the browser to continue to use it (described below with reference to step 304 in FIG. 3 and step 202 and step 206 in FIG. 2), and does not need to apply to the operating system again and wait for allocation by the operating system. This operation is much faster than re-application and allocation of a new piece of anonymous memory, thereby reducing a browsing processing time, and further improving user experience.

In some embodiments where memory is in extreme shortage, the operating system may take back anonymous memory that is not locked by an application. For example, picture decoding data that are associated with the anonymous memory will be deleted together. If the browser needs to perform picture decoding at this time, it needs to apply to the operating system for memory again, to execute picture decoding again.

Figure 2:
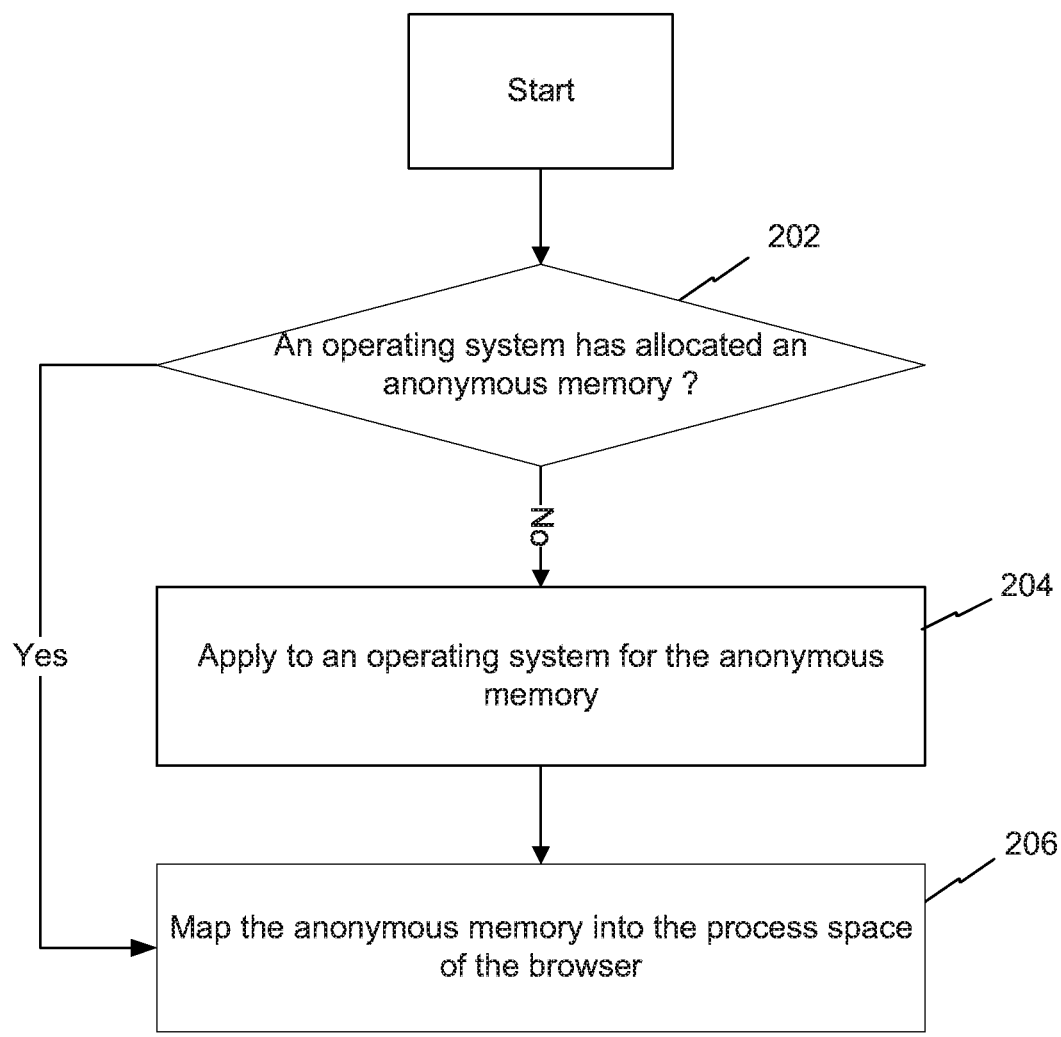
FIG. 2 is a flow diagram illustrating another method for reducing memory usage of a browser in a portable terminal device, according to an exemplary embodiment.

FIG. 2 is a flow diagram illustrating another method 200 for reducing memory usage of a browser in a portable terminal device, according to an exemplary embodiment. Method 200 may be expanded from step 102 of FIG. 1.

At step 202, it is determined whether the operating system has allocated the anonymous memory. An example of step 202 is described below with reference to FIG. 3. If yes, the method proceeds to step 206, where the anonymous memory is mapped into the process space of the browser. If no (e.g. when the browser just receives a request that a web page picture needs to be decoded), the method proceeds to step 204, where the anonymous memory is applied for to the operating system of the portable terminal device. After step 204, the method proceeds to step 206 described above.

In one example, before step 204, a size of the anonymous memory to be applied for may further be determined based on the operation to be executed, and the anonymous memory applied for has the corresponding size.

Figure 3:
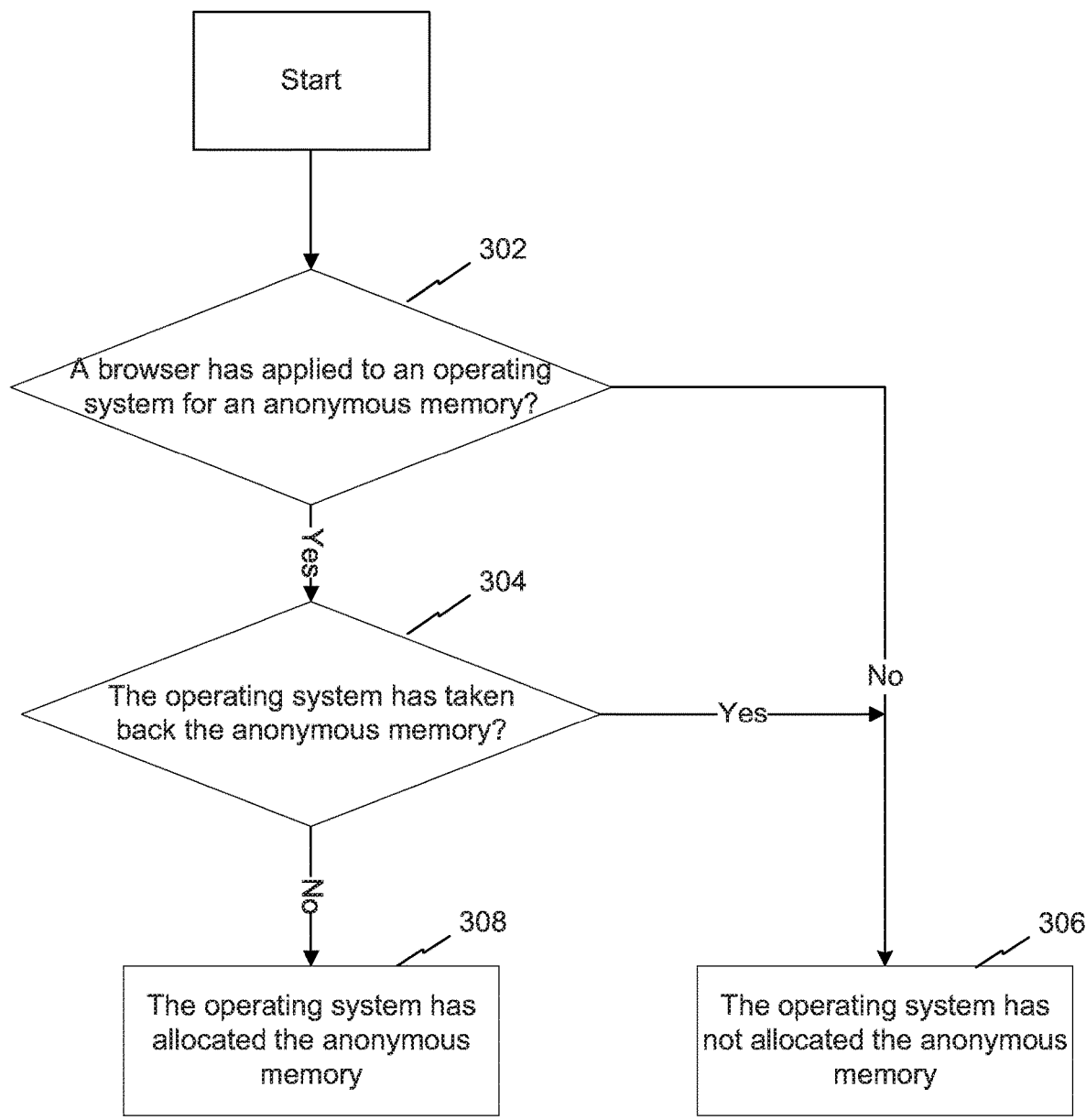
FIG. 3 is a flow diagram illustrating another method for reducing memory usage of a browser in a portable terminal device, according to another exemplary embodiment.

FIG. 3 is a flow diagram illustrating another method 300 for reducing memory usage of a browser in a portable terminal device, according to another exemplary embodiment. At step 302, it is determined whether the browser has applied to the operating system for the anonymous memory. If no (e.g. it is the first time that the browser applies to the operating system for picture anonymous memory and uses the picture anonymous memory), the method proceeds to step 306 where it is determined that the operating system has not allocated the anonymous memory. If yes, the method proceeds to step 304. At step 304, it is determined whether the operating system has taken back the anonymous memory. If yes, the method proceeds to step 306 where it is determined that the operating system has not allocated the anonymous memory. If no, the method proceeds to step 308, where it is determined that the operating system has allocated the anonymous memory.

Figure 4:
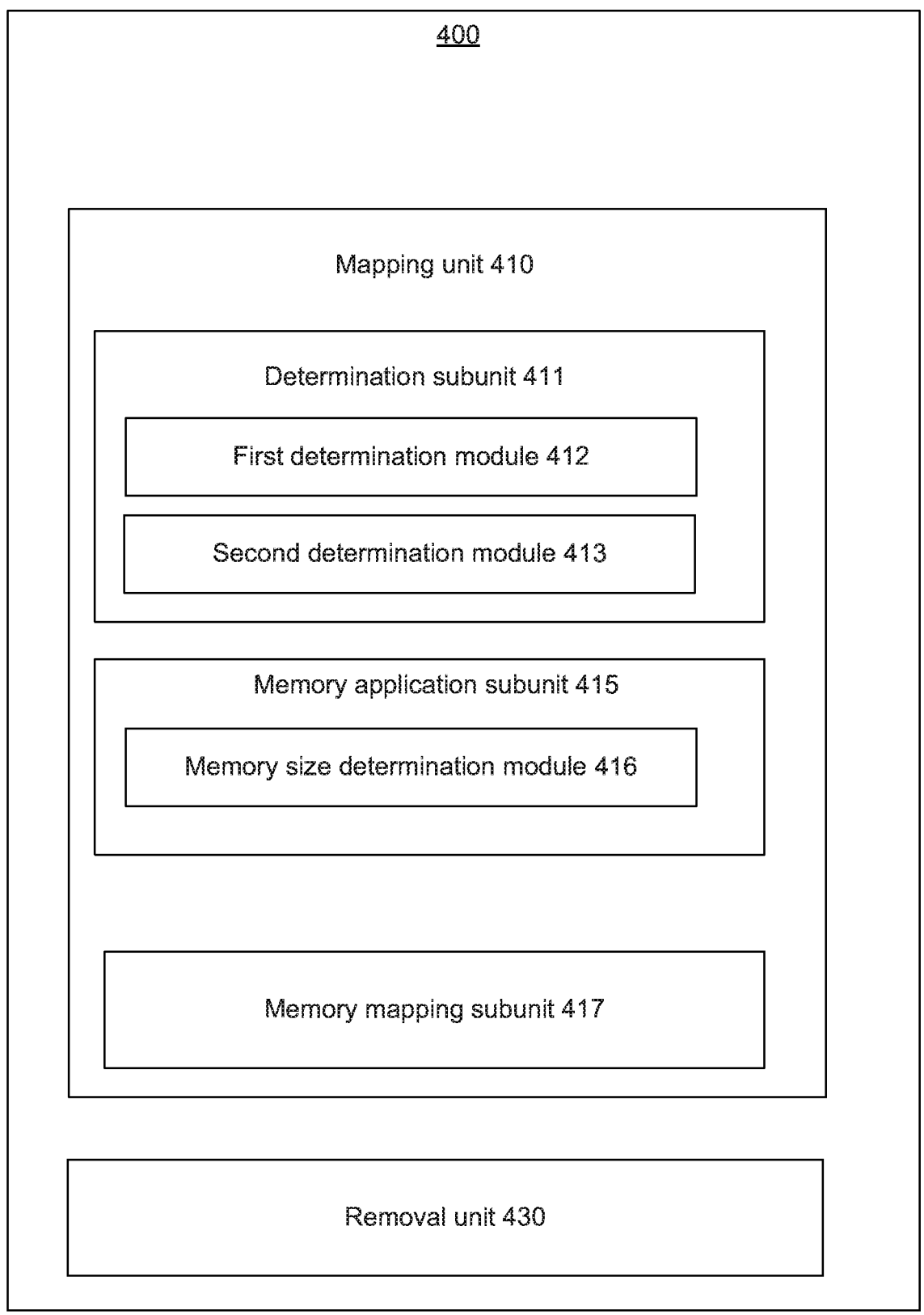
FIG. 4 is a block diagram illustrating an apparatus for reducing memory usage of a browser in a portable terminal device, according to an exemplary embodiment.

FIG. 4 is a block diagram illustrating an apparatus 400 for reducing memory usage of a browser in a portable terminal device, according to an exemplary embodiment. Functional modules of the apparatus 400 for reducing browser memory usage may be implemented by hardware, software, or a combination of the software and the hardware consistent with this disclosure. A person skilled in the art may understand that, the functional modules described in FIG. 4 may be combined or divided into sub-modules. Therefore, the description herein can support any possible combination, or division, or further grouping of the functional modules. Some components may be optional.

Apparatus 400 for reducing browser memory occupancy can timely and effectively reduce system resources used by a browser without affecting a web page browsing experience of a portable terminal user. Apparatus 400 may include a mapping unit 410 and a removal unit 430.

When the user browses a web page and needs to perform a specific operation such as picture decoding, the mapping unit 410 is used to map an anonymous memory, allocated by an operating system of a portable terminal device, into a process space of a browser.

In one example, the mapping unit 410 may determine whether to directly map the anonymous memory into the process space of the browser, or to apply to the operating system for the anonymous memory first, by determining whether anonymous memory has been allocated for, for example, picture decoding.

In one embodiment, the mapping unit 410 may include a determination subunit 411, a memory application subunit 415, and a memory mapping subunit 417. The determination subunit 411 is configured to determine whether the operating system has allocated the anonymous memory. For example, the determination subunit 411 may include a first determination module 412 and a second determination module 413. The first determination module 412 is configured to determine whether the browser has applied to the operating system for the anonymous memory, and if not, to determine that the operating system has not allocated the anonymous memory. The second determination module 413 is configured to determine whether the operating system has taken back the anonymous memory when the anonymous memory has been applied for, if yes, to determine that the operating system has not allocated the anonymous memory, and if no, to determine that the operating system has allocated the anonymous memory.

The memory application subunit 415 may be configured to apply to the operating system for the anonymous memory, if the determination subunit 411 determines that the operating system has not allocated the anonymous memory. In one example, the memory application subunit 415 may further include a memory size determination module 416, which is configured to determine, according to the operation to be executed, a size of the anonymous memory to be applied for. In one example, the operation includes, for example, picture decoding and/or picture drawing. The memory mapping subunit 417 may be configured to map the anonymous memory into the process space of the browser if the determination subunit 411 determines that the operating system has allocated the anonymous memory.

The removal unit 430 may be configured to remove the anonymous memory from the process space of the browser after the operation of the browser is completed by using the anonymous memory mapped by the mapping unit 410 into the process space of the browser.

By using the method and apparatus for reducing browser memory occupancy of the present invention, system resources occupied by the browser can be released in time, thereby reducing pauses of the operating system or the browser and a risk of the browser being forced to end due to excessive memory occupancy.

By using the method and apparatus for reducing browser memory occupancy of the present invention, the anonymous memory that has been released by the browser but has not been taken back by the operating system can be fully utilized, thereby reducing a browsing processing time, and further improving user experience.

By using the method and apparatus for reducing browser memory occupancy of the present invention, system anonymous memory of a corresponding size can be applied for according to an operation to be executed, and release of the picture memory can be implemented, so that system resources are utilized more efficiently.

The flowcharts and block diagram in the accompanying drawings may illustrate system architectures, functions, and operations of possible implementations of the system and method according to multiple examples of the present disclosure. In this regard, each block in the flowcharts or block diagram may represent one module, one program segment, or a part of code, where the module, the program segment or the part of code includes one or more executable instructions used for implementing specified logic functions. It should also be noted that, in some embodiments, functions marked in the blocks may also occur in a sequence different from the sequence illustrated in the drawings. For example, two consecutive blocks actually can be executed in parallel substantially, and sometimes, they can also be executed in reverse order, which depends on functions involved. Each block in the block diagram and/or flowchart, and a combination of blocks in the block diagram and/or flowchart may be implemented by a dedicated hardware-based system for executing specified functions or operations, or may be implemented by a combination of dedicated hardware and computer instructions.

The specification has described methods, apparatus, and systems for reducing memory usage of a browser in a portable terminal device. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

As will be understood by those skilled in the art, embodiments of the present disclosure may be embodied as a method, a system or a computer program product. Accordingly, embodiments of the present disclosure may take the form of an entirely hardware embodiment, an entirely software embodiment or an embodiment combining software and hardware. Furthermore, embodiments of the present disclosure may take the form of a computer program product embodied in one or more computer available storage media (including but not limited to a magnetic disk memory, a CD-ROM, an optical memory and so on) containing computer available program codes.

Embodiments of the present disclosure are described with reference to flow diagrams and/or block diagrams of methods, devices (systems) and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general-purpose computer, a special-purpose computer, an embedded processor, or other programmable data processing devices to produce a machine, such that the instructions, which are executed via the processor of the computer or other programmable data processing devices, create a means for implementing the functions specified in one or more flows in the flow diagrams and/or one or more blocks in the block diagrams.

These computer program instructions may also be stored in a computer readable memory that can direct a computer or other programmable data processing devices to function in a particular manner, such that the instructions stored in the computer readable memory produce a manufactured product including an instruction means which implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions which are executed on the computer or other programmable devices provide steps for implementing the functions specified in one or more flows in the flow diagrams and/or one or more blocks in the block diagrams.

In a typical configuration, a computer device includes one or more Central Processing Units (CPUs), an input/output interface, a network interface and a memory.

The memory may include forms of a volatile memory, a random access memory (RAM) and/or non-volatile memory and the like, such as a read-only memory (ROM) or a flash RAM in a computer readable medium. The memory is an example of the computer readable medium.

The computer readable storage medium refers to any type of physical memory on which information or data readable by a processor may be stored. Thus, a computer readable storage medium may store instructions for execution by one or more processors, including instructions for causing the processor(s) to perform steps or stages consistent with the embodiments described herein. The computer readable medium includes non-volatile and volatile media, removable and non-removable media, wherein information storage can be implemented with any method or technology. Information may be modules of computer readable instructions, data structures and programs or other data. Examples of a computer storage medium include, but are not limited to, a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices or any other non-transmission media which may be used to store information capable of being accessed by a computer device. The computer readable medium is non-transitory, and does not include transitory media, such as modulated data signals and carrier waves.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A method for reducing memory usage of a browser in a portable terminal device, comprising:
    determining whether an operating system of the portable terminal device has allocated an anonymous memory into a process space of a browser, the anonymous memory comprising a particular type of memory that is not backed by a file in a file system of the operating system after allocation of the anonymous memory;

in response to determining that the operating system has not allocated the anonymous memory, applying to the operating system for the anonymous memory to be allocated to the process space of the browser;

in response to determining that the operating system has allocated the anonymous memory, mapping the allocated anonymous memory into the process space of the browser;

removing the mapped anonymous memory from the process space of the browser, after an operation of the browser using the anonymous memory is completed;

after removing the mapped anonymous memory from the process space of the browser, determining whether the operating system has taken back the anonymous memory; and in response to determining that the operating system has not taken back the anonymous memory, mapping the anonymous memory into the process space of the browser and continuing to use the process space without re-applying to the operating system.

2. The method of claim 1, wherein determining whether the operating system has allocated the anonymous memory comprises:
determining whether the browser has applied to the operating system for the anonymous memory;
determining that the operating system has not allocated the anonymous memory, if the browser has not applied to the operating system for the anonymous memory; and
determining whether the operating system has taken back the anonymous memory, if the browser has applied to the operating system for the anonymous memory.

3. The method of claim 2, wherein determining whether the operating system has taken back the anonymous memory comprises:
determining that the operating system has not allocated the anonymous memory, if the operating system is determined to have taken back the anonymous memory; and
determining that the operating system has allocated the anonymous memory, if the operating system is not determined to have taken back the anonymous memory.

4. The method of claim 1, wherein applying to the operating system for the anonymous memory comprises determining, according to the operation of the browser, a size of the anonymous memory to apply for.

5. The method of claim 1, wherein the operation of the browser comprises at least one of picture decoding or picture drawing.

6. An apparatus for reducing memory usage of a browser in a portable terminal device, comprising:
a mapping unit comprising:
a determination subunit configured to determine whether an operating system of the portable terminal device has allocated an anonymous memory into a process space of a browser, the anonymous memory comprising a particular type of memory that is not backed by a file in a file system of the operating system after allocation of the anonymous memory;
a memory application subunit configured to, in response to determination that the operating system has not allocated the anonymous memory, apply to the operating system for the anonymous memory to be allocated to the process space of the browser;
a memory mapping subunit configured to, in response to determination that the operating system has allocated the anonymous memory, map the allocated anonymous memory into the process space of the browser; and a removal unit configured to remove the mapped anonymous memory from the process space of the browser, after an operation of the browser using the anonymous memory is completed;

wherein the determination subunit is further configured to, after removing the mapped anonymous memory from the process space of the browser, determine whether the operating system has taken back the anonymous memory; and wherein the memory mapping subunit is configured to, in response to determining that the operating system has not taken back the anonymous memory, map the anonymous memory into the process space of the browser and continue using the process space without re-applying to the operating system.

7. The apparatus of claim 6, wherein the determination subunit comprises:
a first determination module configured to:
determine whether the browser has applied to the operating system for the anonymous memory; and
determine that the operating system has not allocated the anonymous memory, if the browser has not applied to the operating system for the anonymous memory; and
a second determination module configured to determine whether the operating system has taken back the anonymous memory, if the browser has applied to the operating system for the anonymous memory.

8. The apparatus of claim 7, wherein the second determination module is, if the browser has applied to the operating system for the anonymous memory, further configured to:
determine that the operating system has allocated the anonymous memory, if the operating system is determined to have taken back the anonymous memory; and
determine that the operating system has not allocated the anonymous memory, if the operating system is not determined to have taken back the anonymous memory.

9. The apparatus of claim 6, wherein the memory application subunit comprises a memory size determination module configured to determine, according to the operation of the browser, a size of the anonymous memory to apply for.

10. The apparatus of claim 6, wherein the operation of the browser comprises at least one of picture decoding or picture drawing.

11. A non-transitory computer-readable storage medium embodying a computer program product, the computer program product comprising instructions configured to cause a computing device to perform a method comprising:
determining whether an operating system of the portable terminal device has allocated an anonymous memory into a process space of a browser, the anonymous memory comprising a particular type of memory that is not backed by a file in a file system of the operating system after allocation of the anonymous memory;
in response to determining that the operating system has not allocated the anonymous memory, applying to the operating system for the anonymous memory to be allocated to the process space of the browser;
in response to determining that the operating system has allocated the anonymous memory, mapping the allocated anonymous memory into the process space of the browser;

removing the mapped anonymous memory from the process space of the browser, after an operation of the browser using the anonymous memory is completed;

after removing the mapped anonymous memory from the process space of the browser, determining whether the operating system has taken back the anonymous memory; and in response to determining that the operating system has not taken back the anonymous memory, mapping the anonymous memory into the process space of the browser and continuing to use the process space without re-applying to the operating system.

12. The non-transitory computer-readable storage medium of claim 11, wherein determining whether the operating system has allocated the anonymous memory comprises:

determining whether the browser has applied to the operating system for the anonymous memory;

determining that the operating system has not allocated the anonymous memory, if the browser has not applied to the operating system for the anonymous memory; and determining whether the operating system has taken back the anonymous memory, if the browser has applied to the operating system for the anonymous memory.

13. The non-transitory computer-readable storage medium of claim 12, wherein determining whether the operating system has taken back the anonymous memory comprises:

determining that the operating system has not allocated the anonymous memory, if the operating system is determined to have taken back the anonymous memory; and determining that the operating system has allocated the anonymous memory, if the operating system is not determined to have taken back the anonymous memory.

14. A system for reducing memory usage of a browser in a portable terminal device, comprising:

a processor; and a non-transitory computer-readable storage medium storing instructions that, when executed by the processor, cause the processor to:

determine whether an operating system of the portable terminal device has allocated an anonymous memory into a process space of a browser, the anonymous memory comprising a particular type of memory that is not backed by a file in a file system of the operating system after allocation of the anonymous memory;

in response to determination that the operating system has not allocated the anonymous memory, apply to the operating system for the anonymous memory to be allocated to the process space of the browser;

in response to determination that the operating system has allocated the anonymous memory, map the allocated anonymous memory into the process space of the browser, remove the mapped anonymous memory from the process space of the browser, after an operation of the browser using the anonymous memory is completed;

after removing the mapped anonymous memory from the process space of the browser, determine whether the operating system has taken back the anonymous memory; and in response to determining that the operating system has not taken back the anonymous memory, map the anonymous memory into the process space of the browser and continue to use the process space without re-applying to the operating system.

15. The system of claim 14, wherein to determine whether the operating system has allocated the anonymous memory, the non-transitory computer-readable storage medium further stores instructions that, when executed by the processor, cause the processor to: determine whether the browser has applied to the operating system for the anonymous memory; determine that the operating system has not allocated the anonymous memory, if the browser has not applied to the operating system for the anonymous memory; and determine whether the operating system has taken back the anonymous memory, if the browser has applied to the operating system for the anonymous memory.

16. The system of claim 15, wherein to determine whether the operating system has taken back the anonymous memory, the non-transitory computer-readable storage medium further stores instructions that, when executed by the processor, cause the processor to:

determine that the operating system has not allocated the anonymous memory, if the operating system is determined to have taken back the anonymous memory; and determine that the operating system has allocated the anonymous memory, if the operating system is not determined to have taken back the anonymous memory.

* * * * *